US010257914B2

(12) United States Patent
Sato et al.

(10) Patent No.: US 10,257,914 B2
(45) Date of Patent: Apr. 9, 2019

(54) LIGHT EXPOSURE SYSTEM, PORTABLE TERMINAL, AND LIGHT-EMITTING APPARATUS

(71) Applicant: Panasonic Intellectual Property Management Co., Ltd., Osaka (JP)

(72) Inventors: Ayumu Sato, Niigata (JP); Hironori Takeshita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/626,799

(22) Filed: Jun. 19, 2017

(65) Prior Publication Data

US 2017/0374726 A1 Dec. 28, 2017

(30) Foreign Application Priority Data

Jun. 22, 2016 (JP) ................. 2016-123821

(51) Int. Cl.
*H05B 37/02* (2006.01)
*H04W 4/02* (2018.01)
*H05B 33/08* (2006.01)

(52) U.S. Cl.
CPC .......... *H05B 37/0272* (2013.01); *H04W 4/02* (2013.01); *H05B 33/089* (2013.01); *H05B 33/0842* (2013.01)

(58) Field of Classification Search
CPC ............ H05B 37/0218; H05B 37/0245; H05B 37/0254; H05B 37/0281; H05B 37/0272; H05B 37/0227

USPC ................. 315/152, 294, 224, 306
See application file for complete search history.

(56) References Cited

U.S. PATENT DOCUMENTS

| 8,138,690 | B2 * | 3/2012 | Chemel ................... F21V 17/02 315/318 |
| 8,531,134 | B2 * | 9/2013 | Chemel ................ H05B 37/029 315/291 |
| 2008/0319354 | A1 | 12/2008 | Bell et al. |
| 2012/0143383 | A1 * | 6/2012 | Cooperrider ............. H04Q 9/00 700/295 |

(Continued)

FOREIGN PATENT DOCUMENTS

JP 2582957 B2 2/1997
JP 2006-236716 A 9/2006

(Continued)

*Primary Examiner* — Douglas W Owens
*Assistant Examiner* — Syed M Kaiser
(74) *Attorney, Agent, or Firm* — McDermott Will & Emery LLP

(57) ABSTRACT

A light exposure system includes an external apparatus that is placed on a facility and a portable terminal that communicates with the external apparatus, and manages the amount of light which the user is exposed to. Furthermore, the external apparatus transmits information regarding the amount of light which the user is exposed to, to the portable terminal. In addition, the portable terminal includes: a terminal-side controller which receives the information from the external apparatus and calculates the cumulative value of the amount of light from the information, when a communication is established with the external apparatus; and a display that displays the cumulative value calculated by the terminal-side controller.

11 Claims, 4 Drawing Sheets

(56) References Cited

U.S. PATENT DOCUMENTS

| | | | |
|---|---|---|---|
| 2012/0206050 A1* | 8/2012 | Spero | B60Q 1/04 |
| | | | 315/152 |
| 2014/0055040 A1 | 2/2014 | Nishigaki et al. | |
| 2014/0056028 A1* | 2/2014 | Nichol | G02B 6/0028 |
| | | | 362/611 |
| 2014/0097758 A1* | 4/2014 | Recker | H05B 37/0272 |
| | | | 315/152 |
| 2016/0041095 A1* | 2/2016 | Rothberg | G01N 21/6408 |
| | | | 506/4 |
| 2016/0366746 A1* | 12/2016 | van de Ven | F21V 29/74 |
| 2017/0374726 A1* | 12/2017 | Sato | H04W 4/02 |

FOREIGN PATENT DOCUMENTS

| | | |
|---|---|---|
| JP | 2009-48988 A | 3/2009 |
| JP | 2010-238572 | 10/2010 |
| JP | 2014-060136 A | 4/2014 |
| JP | 2014-136140 A | 7/2014 |
| JP | 5684565 B2 | 3/2015 |

* cited by examiner

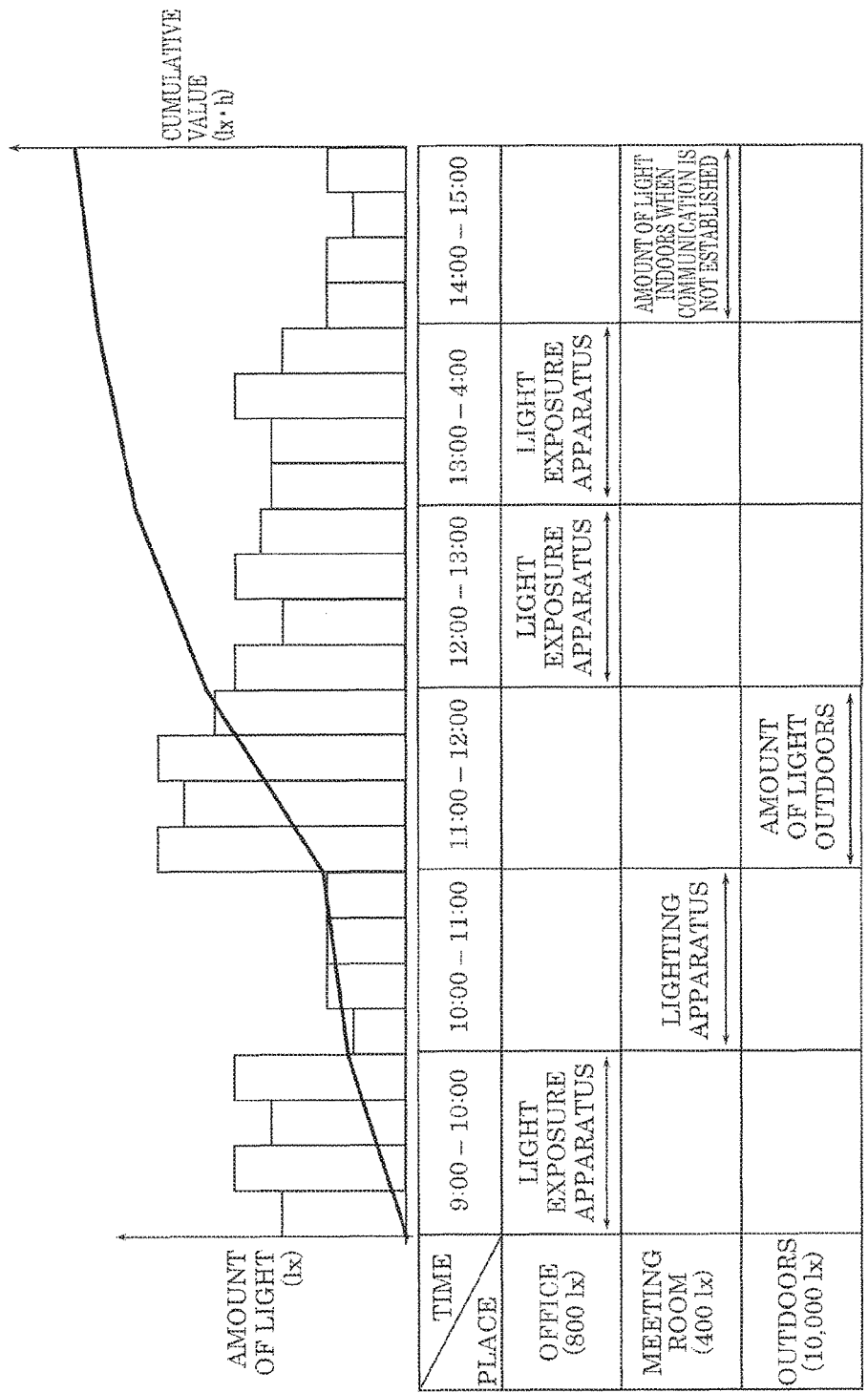

LIGHT EXPOSURE SYSTEM, PORTABLE TERMINAL, AND LIGHT-EMITTING APPARATUS

CROSS REFERENCE TO RELATED APPLICATION

This application claims the benefit of priority of Japanese Patent Application Number 2016-123821 filed on Jun. 22, 2016, the entire content of which is hereby incorporated by reference.

BACKGROUND

1. Technical Field

The present disclosure relates to a light exposure system, a portable terminal, and a light-emitting apparatus.

2. Description of the Related Art

A lighting control system (an example of a light exposure system) having a lamp for lighting (an example of a light source) that outputs visible light (an example of light) for performing visible light communication is conventionally disclosed (see, for example, Japanese Unexamined Patent Application Publication No. 2009-48988 (Patent Literature 1)).

SUMMARY

In the conventional light exposure system, although it is possible to calculate the amount of light from a light source that performs visible light communication, the amount of light that a user is exposed to in one day cannot be calculated at a place where a light source that performs visible light communication is not present. Now, it is possible to calculate the amount of light that a user is exposed to in one day, by making the user wear a sensor. In this case, however, the user has to wear an apparatus equipped with the sensor, which is unbearably inconvenient. As such, there is a demand for being able to calculate the amount of light that a user is exposed to in one day without having to wear an apparatus equipped with an illuminance sensor.

In view of this, the present disclosure provides a light exposure system, a portable terminal, and a light-emitting apparatus which enable the total amount of light that a user is actually exposed to in one day to be calculated, without the user having to wear a sensor.

A light exposure system according to an aspect of the present disclosure is a light exposure system that manages an amount of light which a user is exposed to, and includes: an external apparatus that is placed on a facility; and a portable terminal that communicates with the external apparatus, wherein the external apparatus transmits information regarding the amount of light which the user is exposed to, to the portable terminal, and the portable terminal includes: a terminal-side controller that receives the information from the external apparatus and calculates a cumulative value of the amount of light from the information, when a communication is established with the external apparatus; and an indicator that indicates the cumulative value calculated by the terminal-side controller.

Furthermore, a light exposure system according to an aspect of the present disclosure is a light exposure system that manages an amount of light which a user is exposed to, and includes: a server; and a portable terminal that communicates with the server, wherein the server: obtains position information of the portable terminal and time information corresponding to the position information from the portable terminal; obtains weather information corresponding to the position information and the time information from an external source, when no communication is established between the portable terminal and an external apparatus that is placed on a facility; calculates an estimated cumulative value of the amount of light from the position information, the time information, and the weather information; and transmits information regarding the estimated cumulative value to the portable terminal.

Furthermore, a light exposure system according to an aspect of the present disclosure is a light exposure system that manages an amount of light which a user is exposed to, and includes: an external apparatus that is placed on a facility; and a portable terminal that communicates with the external apparatus, wherein the external apparatus includes: a detector that detects the amount of light in surroundings; and a communicator that transmits information regarding the amount of light detected by the detector to the portable terminal, and the portable terminal includes a terminal-side controller that receives the information from the external apparatus and calculates a cumulative value of the amount of light from the information, when a communication is established with the external apparatus.

Furthermore, a light exposure system according to an aspect of the present disclosure is a light exposure system that manages an amount of light which a user is exposed to, and includes: a light-emitting apparatus; and a portable terminal that communicates with the light-emitting apparatus, wherein the light-emitting apparatus includes: a light source; a controller that calculates information regarding the amount of light of the light source which the user is exposed to; and a communicator that transmits the information calculated by the controller, and the portable terminal includes a terminal-side controller that receives the information from the light-emitting apparatus and calculates a cumulative value of the amount of light from the information, when a communication is established with the light-emitting apparatus.

Furthermore, a portable terminal according to an aspect of the present disclosure is a portable terminal that communicates with an external apparatus that is placed on a facility, and includes: a terminal-side controller that receives information regarding an amount of light, which a user is exposed to, detected by the external apparatus from the external apparatus and calculates a cumulative value of the amount of light from the information, when a communication is established with the external apparatus; and an indicator that indicates the cumulative value calculated by the terminal-side controller.

Furthermore, a light-emitting apparatus according to an aspect of the present disclosure is a light-emitting apparatus that communicates with the aforementioned portable terminal, and includes: a light source; a detector that detects an amount of light in surroundings; a controller that calculates information regarding the amount of light of the light source detected by the detector; and a communicator that transmits the information calculated by the controller to the portable terminal.

According to the present disclosure, the total amount of light that a user is actually exposed to in one day can be calculated without the user having to wear a sensor

BRIEF DESCRIPTION OF DRAWINGS

The figures depict one or more implementations in accordance with the present teaching, by way of examples only.

FIG. 4 is a conceptual diagram illustrating the relationship between the amount of light and cumulative value and time in the light exposure system according to the embodiment.

DETAILED DESCRIPTION OF THE EMBODIMENT

Figure 1:
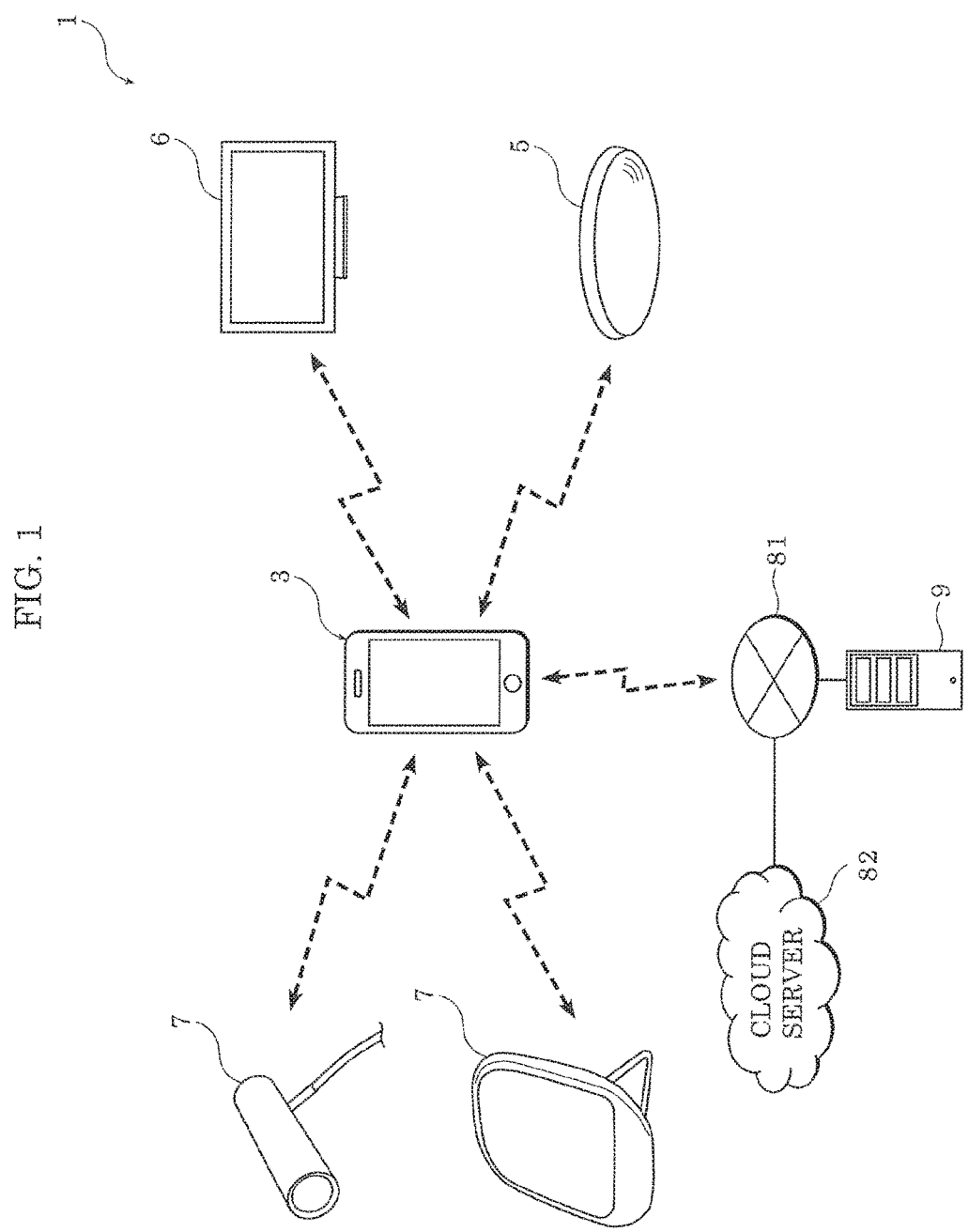
FIG. 1 is a schematic diagram illustrating a light exposure system according to an embodiment.

Hereinafter, an exemplary embodiment of the present disclosure will be described with reference to the drawings. It should be noted that the subsequently-described embodiment shows a specific example of the present disclosure. Therefore, numerical values, shapes, materials, structural components, the arrangement and connection of the structural components, etc. shown in the following exemplary embodiment are mere examples, and are not intended to limit the scope of the present disclosure. Furthermore, among the structural components in the following exemplary embodiment, components not recited in any one of the independent claims which indicate the broadest concepts of the present invention are described as arbitrary structural components.

Furthermore, the expression "approximately . . . ", described here using "approximately the same" as an example, is intended to include not only something that is exactly the same but also something that is acknowledged to be substantially the same.

It should be noted that the respective figures are schematic diagrams and are not necessarily precise illustrations. Furthermore, in the respective figures, substantially identical components are assigned the same reference signs, and overlapping description is omitted or simplified.

Embodiment

A light exposure system, a portable terminal, and a light-emitting apparatus according to an embodiment of the present disclosure are described below.

[Outline]

In the complex modern society, the environment is such that a person's circadian rhythm is easily disrupted, and thus improving circadian rhythm is difficult. Here, circadian rhythm refers to a biological rhythm that exhibits a cycle of one day, such as when a person, as a physiological phenomenon, naturally feels sleepy at a certain time and naturally wakes up after sleeping for a certain time. A disruption in the biological rhythm causes various disorders such as sleeping disorders or deterioration of concentration due to sleeping disorders.

A method of treatment called light therapy is known as a method of ameliorating such a disruption of biological rhythm. Light therapy is a method of treatment in which a person is exposed to sunlight (primarily visible light) or light equivalent to sunlight, etc., to adjust the person's biological clock and thereby put the biological rhythm in order.

In light therapy, it is known that, in the case of light having a brightness of approximately 3000 lx for example, exposing a person to such light for two hours, roughly between the time when the sun starts to rise up to 3 o'clock in the afternoon, resets the biological clock and achieves a modulated biological rhythm. In addition, absorbing such a light mainly from the eyes is known to be effective.

Here, whereas one day has 24 hours, the human biological clock is not necessarily 24 hours. The biological clock (said to be approximately 24 to 25 hours) is different depending on the person. For example, in the case of a person for whom one day is 25 hours, the natural awakening time and sleeping time are delayed by one hour each day as days pass. It is known that, even for a person whose one-day biological rhythm has 25 hours, the biological clock can be reset by exposure to visible light. In other words, this resetting of the biological clock works to put the biological rhythm in order.

Through daily light exposure (absorbing light from a person's eyes), the amount of a hormone called serotonin that is secreted increases. Then, with the serotonin providing sustenance, a hormone called melatonin is secreted at night, which makes the person feel sleepy (high quality sleep can be obtained). In this manner, by making light therapy a habit, the biological rhythm can put into a healthy state.

Based on the above, it is desired that a person whose biological rhythm is disrupted, a person who is at risk of having a disrupted biological rhythm, etc., be exposed to a predetermined amount of light within a predetermined period. As such, it is desired that such people be informed of the total amount of light that they have been exposed to in the predetermined period. Furthermore, it is desired that such people be informed of the amount of light that is still deficient (remaining light amount) from the amount of light that the person needs to be exposed to in one day.

As such, although a method in which a user wears a sensor in order to measure the amount of light is conceivable, the user would have to wear an apparatus equipped with the sensor, which is unbearably inconvenient.

In view of this, a light exposure system, a portable terminal, and a light-emitting apparatus are provided which enable the total amount of light that a user is actually exposed to in one day to be calculated without the user having to wear a sensor. By using such a light exposure system, portable terminal, and light-emitting apparatus, it is possible to find out the total amount of light that the user is exposed to in the predetermined period, and it is possible to find out the remaining light amount from the total amount of light that the person needs to be exposed to in one day.

[Configuration]

First, the configuration of light exposure system 1, portable terminal 3, and lighting apparatus 5 according to this embodiment will be described with reference to FIG. 1 and FIG. 2.

FIG. 1 is a schematic diagram illustrating light exposure system 1 according to this embodiment. FIG. 2 is a block diagram illustrating light exposure system 1 according to this embodiment.

As illustrated in FIG. 1, light exposure system 1 is a system which manages the amount of light that a user has been exposed to. Light exposure system 1 calculates, using portable terminal 3 and light exposure apparatus 7, etc., cumulative value X (total amount of light) from the amount of light that the user has been exposed to in one day, and communicates (displays) cumulative value X to the user. Light exposure system 1 can be used at home, at the workplace, or while traveling between the home and workplace, etc.

In this embodiment, the amount of light that the user is exposed to refers to the light exposure amount which is absorbed from the eyes. Furthermore, cumulative value X is the accumulated light exposure amount in a predetermined time period assuming that the amount of light per predetermined time period is uniform.

Light exposure system 1 includes an external apparatus, portable terminal 3, and server 9. The external apparatus is an apparatus that is placed in a facility. For example, the external apparatus is a light-emitting apparatus such as lighting apparatus 5 (an example of a light-emitting apparatus) or light exposure apparatus 7 (an example of a light-emitting apparatus), or an apparatus such as TV 6, and is an apparatus other than portable terminal 3. Furthermore, the external apparatus is an apparatus that can communicate with portable terminal 3, and transmit information regarding the amount of light to portable terminal 3. In this manner, aside from an apparatus that is fixed to a facility such as a wall, a ceiling, etc., of a building, the external apparatus also includes an apparatus that is placed on a facility such as a table.

[Lighting Apparatus]

Although lighting apparatus 5 is, for example, a straight-tube LED lamp or a downlight that is recessed in a ceiling with a light-emitting module facing down, etc., lighting apparatus 5 is not limited to such, and may be an apparatus that emits light like a TV, etc.

Figure 2:
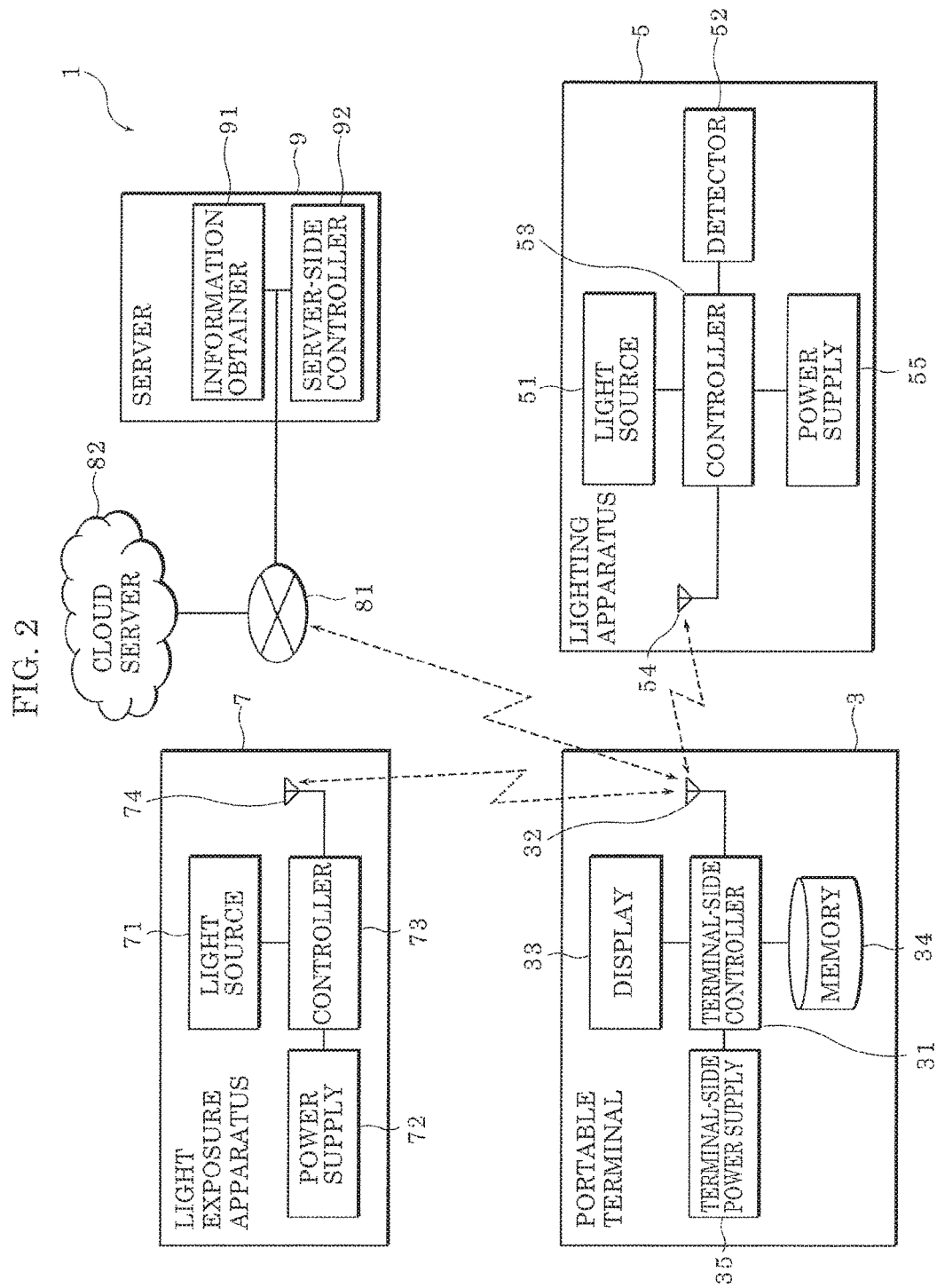
FIG. 2 is a block diagram illustrating the light exposure system according to the embodiment.

As illustrated in FIG. 2, lighting apparatus 5 includes light source 51, detector 52, controller 53, communicator 54, and power supply 55.

Light source 51 is what is called a surface mount device (SMD) LED element. Light source 51 lights up and turns off by being controlled by a control circuit. Furthermore, dimming control and toning control is performed on light source 51 by way of the control circuit controlling (that is, adjusting the amount of power supplied by) power supply 55. The control circuit is implemented by a microcomputer, a processor, or a dedicated circuit, etc. that controls the value of the current, etc., supplied to light source 51, according to an inputted signal. It should be noted that the control circuit may be provided in controller 53 or may be a control circuit different from controller 53.

Detector 52 is provided to be able to take in light in the surroundings, for example, and is a sensor that detects the brightness (amount of light) in the surroundings. Detector 52 is, for example, an illuminance sensor, and transmits information regarding the amount of light detected to controller 53.

Controller 53 is electrically connected to light source 51, communicator 54, power supply 55, etc. Controller 53 receives the information regarding the amount of light transmitted from detector 52. Controller 53 intermittently transmits the information regarding the amount of light to portable terminal 3 via communicator 54.

It should be noted that, for example, controller 53 may be capable of calculating the amount of light of light source 51. Specifically, for example, controller 53 detects the current flowing through light source 51 based on the voltage drop in a sense resistor connected in series with light source 51. Since the degree of dimming (amount of light) of light source 51 corresponds to the current flowing through light source 51, the amount of light of light source 51 is detected based on the current.

It should be noted that, for example, when there is no need to detect the light in the surroundings, such as in a room that is difficult for light to enter, it is sufficient to merely calculate the amount of light of light source 51 only. As such, detector 52 is not an essential structural component of lighting apparatus 5.

Communicator 54 is a device including an antenna with which lighting apparatus 5 performs wireless communication with portable terminal 3, etc. For example, communicator 54 is a device having a short-range wireless communication function such as ZigBee (registered trademark), Wi-Fi (registered trademark), Bluetooth (registered trademark), etc.

Power supply 55 includes, for example, a case made of insulating resin which is a power supply box, and a power supply circuit disposed inside the case. The power supply circuit is a circuit unit including a circuit board and circuit components mounted on the circuit board, and supplies light source 51 with power for causing light source 51 to light up (emit light). Power supply 55 converts, for example, power from a power system into direct current power of a predetermined level by performing rectification, smoothing, step-down, etc., and supplies the direct current power to light source 51. Light source 551 emits light according to the direct current power supplied from the power supply circuit.

Power supply 55 is controlled by controller 53 to turn ON and OFF supply of power to light source 51. For example, when an operation to light up is received via a control section of a remote control, controller 53 supplies power from power supply 55 to light source 51, to cause light source 51 to light up. Furthermore, when the control section receives an operation to turn off the light, controller 53 cuts off the supply of power from power supply 55 to light source 51, to cause light source 51 to turn OFF.

[Portable Terminal]

Portable terminal 3 is a portable terminal device such as a smart phone, a tablet terminal device, and is a separate unit from the external apparatus. Furthermore, portable terminal 3 can perform wireless communication with the external apparatus via terminal-side communicator 32, has a global positioning system (GPS) function for obtaining position information on the position at which portable terminal 3 is located, and obtains its own position information by using the GPS function. Furthermore, portable terminal 3 can also access server 9 via network 81.

Portable terminal 3 includes terminal-side controller 31, terminal-side communicator 32, display 33 (an example of an indicator), memory 34, and terminal-side power supply 35.

Terminal-side controller 31 includes circuits, etc., for controlling terminal-side communicator 32, display 33, memory 34, terminal-side power supply 35, etc. Terminal-side communicator 32, display 33, memory 34, terminal-side power supply 35, etc., are electrically connected to terminal-side controller 31. Terminal-side controller 31 implements the subsequent operations through a processor or a microcomputer, etc, or a dedicated circuit.

Terminal-side controller 31 receives, via terminal-side communicator 32, information transmitted from external apparatuses such as lighting apparatus 5 or light exposure apparatus 7. Specifically, when the external apparatus is lighting apparatus 5, for example, terminal-side controller 31 receives, via terminal-side communicator 32, the information regarding the amount of light which is transmitted by controller 53 of lighting apparatus 5. At this time, by receiving the information regarding the amount of light, terminal-side controller 31 determines that communication is established between portable terminal 3 and lighting apparatus 5. Establishment of communication between portable terminal 3 and lighting apparatus 5 refers to a state in which portable terminal 3 is located at a position at which information regarding the amount of light can be received from lighting apparatus 5. It should be noted that, in the same manner, when the external apparatus is light exposure apparatus 7, terminal-side controller 31 receives information regarding the amount of light, via terminal-side communicator 32.

Furthermore, terminal-side controller 31 calculates cumulative value X of the amount of light as necessary, based on information regarding the amount of light which is sequentially transmitted from lighting apparatus 5, etc. In this embodiment, terminal-side controller 31 stores the information of cumulative value X of the amount of light for one day in memory 34. It should be noted that, for example, when there is a remaining light amount on the previous day based on historical information regarding cumulative value X for one day, terminal-side controller 31 may display such fact via display 33 to prompt diligent light exposure to the user.

It should be noted that terminal-side controller 31 may store, in memory 34, information such as sub-cumulative value A1, sub-cumulative value Bi, estimated cumulative value Ci, etc., of the amount of light of an external apparatus. Furthermore, for example, cumulative value X, sub-cumulative value A1, sub-cumulative value Bi, estimated cumulative value Ci of the amount of light stored in memory 34 may be for each of a predetermined time period such as 1 minute, 10 minutes, 1 hour, 1 day.

When calculating sub-cumulative value B1, terminal-side controller 31 may recognize, from a table indicating the amount of light corresponding to an indoor setting (place), the amount of light corresponding to an indoor setting. It should be noted that terminal-side controller 31 may calculate estimated cumulative value Ci by obtaining weather information from server 9, and recognizing the amount of light corresponding to position information, time information, and weather information from a table indicating the amount of light corresponding to such information. The time information is information corresponding to the position information, and the weather information corresponds to the position information and the time information.

Furthermore, terminal-side controller 31 accesses server 9 from network 81, via terminal-side communicator 32, and transmits the position information of portable terminal 3 to server 9.

Terminal-side communicator 32 is a device which includes an antenna and which performs wireless communication with lighting apparatus 5, light exposure apparatus 7, server 9, etc. In this embodiment, terminal-side communicator 32 receives information regarding the amount of light from lighting apparatus 5, light exposure apparatus 7, server 9, etc.

Display 33 is a monitor such as a liquid-crystal display, an LED display, an organic EL display, etc. Display 33, for example, displays cumulative value X of the amount of light calculated by terminal-side controller 31, and displays the amount of light that a user still needs to be exposed to (remaining light amount) out of the amount of light that is needed in one day.

Memory 34 is a storage device in which a control program executed by terminal-side controller 31 and information such as cumulative value X, sub-cumulative value A1, sub-cumulative value Bi, and estimated cumulative value Ci of the amount of light are stored. As for calculating sub-cumulative value Bi, a table indicating the amount of light corresponding to the indoor setting (place) is stored in advance in memory 34. Memory 34 is implemented by a semiconductor memory, for example. It should be noted that terminal-side controller 31 may store, in memory 34: cumulative value X of the amount of light that the user is exposed to each day (historical information regarding cumulative value X for one day); the amount of light (remaining light amount) that is deficient per day; position information; time information; and weather information.

Cumulative value X of the amount of light that is needed in 1 day (a predetermined threshold value described later) is stored in memory 34 in order to display the amount of light that the user is exposed to on display 33. The predetermined threshold value may be set arbitrarily.

As for calculating estimated cumulative value C, it should be noted that, in the case where weather information is obtained from server 9, a table indicating the amount of light corresponding to position information, time information, and weather information may be stored in advance in memory 34.

Terminal-side power supply 35 is a battery such as a primary battery, a secondary battery, etc., but may be, for example, a power supply supplied from the outside such as a personal computer. Terminal-side power supply 35 is connected to terminal-side controller 31, and supplies power to respective components such as display 33, memory 34 via terminal-side controller 31.

[Light Exposure Apparatus]

Light exposure apparatus 7 is an apparatus that is used when the user diligently undergoes light exposure, and irradiates light for improving biological rhythm. With light exposure apparatus 7, it is possible to emit light which can improve biological rhythm, in a state where light exposure apparatus 7 is, for example, placed on a desk in an office, etc., a dressing table, etc. Light exposure apparatus 7 includes light source 71, power supply 72, controller 73, and communicator 74. In this embodiment, light that can improve biological rhythm is light including a large amount of blue light (bluish light), and may be for example light obtained by adding white light to blue light.

Light source 71 of light exposure apparatus 7 normally irradiates blue light and white light (light that can improve biological rhythm). Light source 71 of light exposure apparatus 7 may be an SMD LED element like light source 71 of light source 51 of lighting apparatus 5. Light source 71 of light exposure apparatus 7 performs lighting up, turning OFF, dimming, and toning by being controlled by a control circuit via a control unit that is not illustrated in the drawings.

Light source 71 includes a blue light source that irradiates blue light a white light source that irradiates white light. The blue light described here refers not to light that is blue in the strict sense but normally to light that looks blue. The white light described here refers not to light that is white in the strict sense but normally to light that looks white.

Power supply 72 is a power supply circuit that supplies light source 71 with power for causing light source 71 to light up (emit light). Power supply 72 supplies light source 71 with power supplied from a power system.

Controller 73 intermittently transmits information regarding the amount of light irradiated from light source 71, to portable terminal 3, via communicator 74. Controller 73 may be capable of calculating the amount of light of light source 71. Specifically, controller 73 calculates the amount of light emitted by light source 71, from the amount of power supplied to light source 71 by power supply 72.

With such light exposure apparatus 7, for example, the output of light irradiated by light source 71 can be raised when it is desired to increase the amount of light that can improve biological rhythm, and the output of light irradiated by light source 71 can be lowered when it is desired to reduce the amount of light that can improve biological rhythm. In other words, the output of light source 71 may be made freely adjustable by user operation.

Furthermore, like lighting apparatus 5, light exposure apparatus 7 may have a detector that detects the amount of light in the surroundings.

[Server]

Server 9 is an ordinary computer that accesses cloud server 82 via network 81 to obtain weather information corresponding to position information and time information. Server 9 includes server-side controller 91 and information obtainer 92.

Server-side controller 91 includes a circuit, etc., for controlling information obtainer 92, etc. Server-side controller 91 causes information obtainer 92 to access cloud server 82 via network 81 to obtain the weather information corresponding to the position information and time information.

Server-side controller 91 extracts information regarding the amount of light corresponding to the position information and the time information from the weather information obtained via information obtainer 92, calculates estimated cumulative value Ci from the information, and transmits estimated cumulative value Ci to portable terminal 3 via a communication interface not illustrated in the drawings and network 81.

It should be noted that, when portable terminal 3 has a table indicating the amount of light corresponding to position information, time information, and weather information, server-side controller 91 may transmit weather information to portable terminal 3.

[Operation]

The operation of portable terminal 3 in light exposure system 1 according to this embodiment will be described with reference to FIG. 3.

Figure 3:
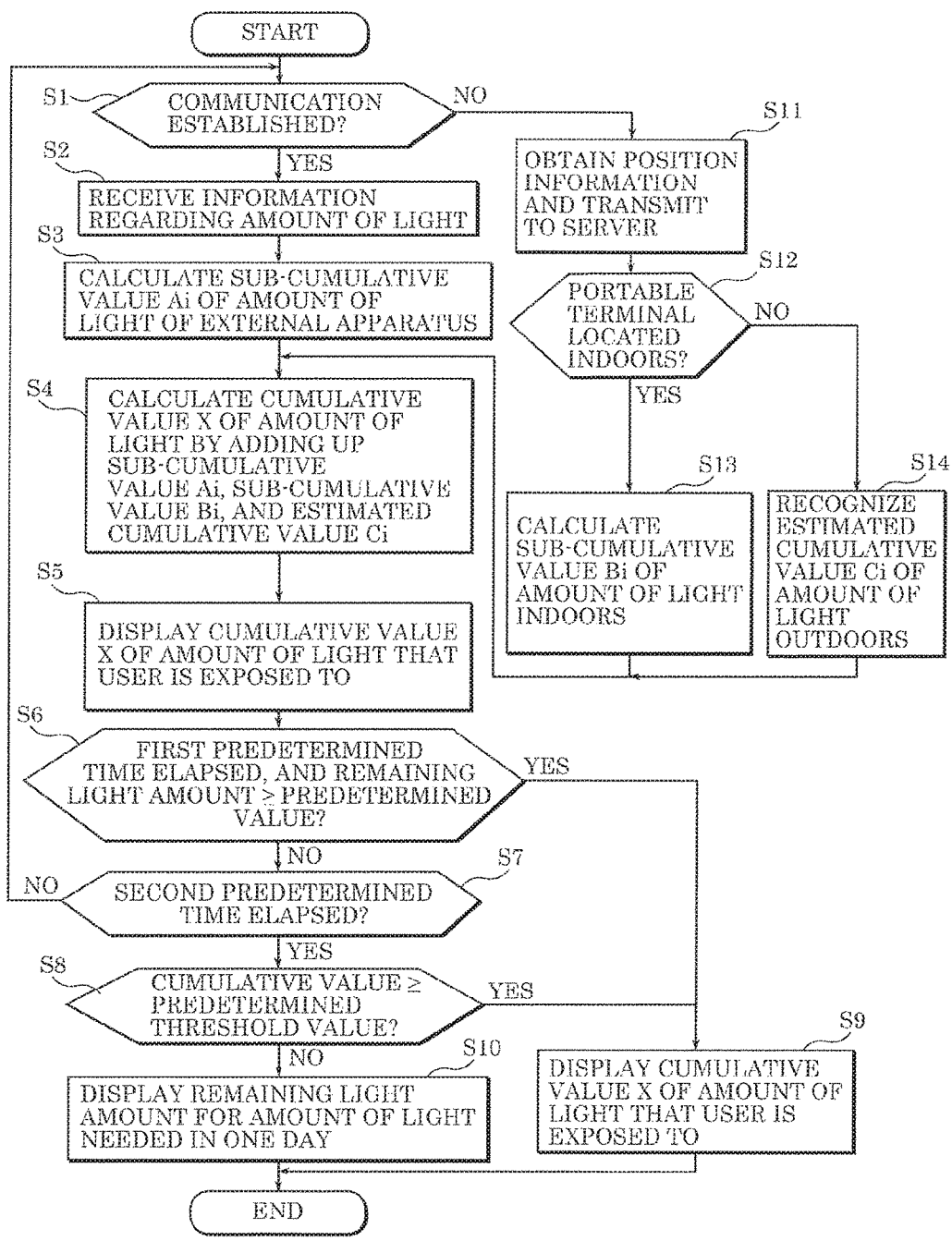
FIG. 3 is a flowchart of the operation of the light exposure system according to the embodiment.

FIG. 3 is a flowchart of the operation of light exposure system according to this embodiment.

First, portable terminal 3 and an external apparatus such as lighting apparatus 5 are activated. Portable terminal 3 activates a dedicated application that calculates and displays on display 33 the amount of light which the user is exposed to. Then, portable terminal 3 is placed in the state in which the cumulative value X of the amount of light in 1 day can be calculated.

Here, it is assumed that, normally, the user carries portable terminal 3 or is located near portable terminal 3. As such, in light exposure system 1, indoors, the amount of light irradiated from the external apparatus located near the current position of portable terminal 3 is assumed as the amount of light that the user is exposed to. In other words, when the user is carrying portable terminal 3, cumulative value X of the amount of light becomes a more accurate value. Furthermore, outdoors, the GPS function of portable terminal 3 is used, server 9 is accessed via network 81, and the amount of light corresponding to position information, time information, and weather information is obtained from server 9. In other words, when the user is carrying portable terminal 3, the amount of light which the user is exposed to can be known even outdoors.

As illustrated in FIG. 3, first, terminal-side controller 31 of portable terminal 3 determines whether communication is established between portable terminal 3 and the external apparatus (step S1). This determination is made according to whether portable terminal 3 can receive the information regarding the amount of light which is transmitted by the external apparatus. When communication is established between portable terminal 3 and the external apparatus, portable terminal 3 is able to obtain the information regarding the amount of light from the external apparatus, and thus does not need to use the GPS function and access server 9 via network 81.

Next, when communication is established between portable terminal 3 and the external apparatus (YES in step S1), portable terminal 3 receives the information regarding the amount of light which is transmitted from the external apparatus (step S2).

Next, terminal-side controller 31 calculates sub-cumulative value Ai of the amount of light of the external apparatus (step S3).

Next, terminal-side controller 31 adds up sub-cumulative value Ai, sub-cumulative value Bi of the amount of light indoors, and estimated cumulative value Ci to be described later, to calculate cumulative value X (total of sub-cumulative value Ai, sub-cumulative value Bi, and estimated cumulative value Ci) (step S4). For example, here, when sub-cumulative value B1 and estimated cumulative value Ci of the amount of light indoors is not obtained, cumulative value X of the amount of light is calculated with sub-cumulative value BI of the amount of light indoors and estimated cumulative value Ci as 0. It should be noted that Ai, Bi, and Ci are variables, and are natural numbers greater than or equal to 1.

Next, terminal-side controller 31 displays, via display 33, cumulative value X of the amount of light that the user is exposed to (step S5).

Next, terminal-side controller 31 determines whether a first predetermined time has elapsed, and determines whether the remaining light amount is greater than or equal to a predetermined value (step S6). The first predetermined time is a time that is ahead of a second predetermined time to be described later, and is a time for determining whether to prompt diligent light exposure to the user, when the remaining light amount is large in the first predetermined time (i.e., when the remaining light amount is greater than or equal to the predetermined amount). In this embodiment, for example, the first predetermined time is set at 2 o'clock in the afternoon (1400 hrs). This means that, since it is recommended that a person be exposed to light having a brightness of 3,000 lx for at least 2 hours by 3 o'clock in the afternoon, the remaining light amount which is the amount of light that is deficient from the amount of light needed in one day is calculated, for example, one hour before the first predetermined time of 1400 hrs. The remaining light amount is the amount of light remaining when the current cumulative value of the amount of light is subtracted from the amount of light that is needed in one day. The predetermined value is a threshold value for preventing exposure to a large amount of light in a short time when the remaining light amount is too large. The predetermined value is less than cumulative value X of the amount of light that is needed in one day.

Next, when terminal-side controller 31 determines that at least either the first predetermined time has not elapsed or the remaining light amount is less than the predetermined value (NO in step S6), terminal-side controller 31 determines whether a second predetermined time has elapsed (step S7). Although, for example, any time may be set for the second predetermined time, about 3 o'clock in the afternoon (1500 hrs) is set in this embodiment. This means that, since exposure to light having a brightness of, for example, approximately 3,000 lx for at least two hours between the time in the morning when the sun starts to rise up to 3 o'clock in the afternoon is recommended, exposure to light after this time need not be included in cumulative value X of the amount of time that a user is exposed to.

Next, when terminal-side controller 31 determines that the second predetermined time has not elapsed (NO in step S7), the flow returns to step S1.

On the other hand, when terminal-side controller 31 determines that the second predetermined time has elapsed (YES in step S7), terminal-side controller 31 determines whether cumulative value X is greater than or equal to a predetermined threshold value (step S8). It should be noted that terminal-side controller 31 may store, for example, cumulative value X from 0900 hrs to 1500 hrs, as historical information regarding cumulative value X in one day, in memory 34.

Next, when terminal-side controller 31 determines that cumulative value X is greater than or equal to a predetermined threshold value (YES in step S8), terminal-side controller 31 displays, on display 33, cumulative value X of the amount of light that the user is exposed to (step S9). Then, this flow ends.

Furthermore, when terminal-side controller 31 determines that cumulative value X is less than the predetermined threshold value (NO in step S8), terminal-side controller 31 causes display 33 to display the remaining light amount for the amount of light that is needed in one day, in order to prompt diligent light exposure to the user (step S10). Specifically, the remaining light amount for the amount of light necessary in one day is calculated by subtracting cumulative value X calculated in step S3 from the amount of light needed in one day. Here, terminal-side controller 31 may cause display 33 to display the remaining light amount for the amount of light need in one day, and cause a display prompting diligent light exposure to the user. For example, a notification such as a display or audio, "Please expose yourself to a light of ABC lx within Y hours", etc., may be performed. By doing so, the user can recognize that the amount of light that he/she is exposed to is small, and thus operate light exposure apparatus 7 and be exposed to the amount of light needed in one day. Then, this flow ends.

Furthermore, when terminal-side controller 31 determines in step S6 that the first predetermined time has elapsed and that the remaining light amount is less than the predetermined value (YES in step S6), the flow may advance to step S9. In this case, since it can be determined that the remaining light amount is too large, the user will be exposed to a large amount of light in a short time. As such, as in step S10, notification to prompt diligent light exposure to the user need not be performed. Although, in the case of YES in step S6, the flow ends after advancing to step S9, it should be noted that, in the case of YES in step S6, cumulative value X of the amount of light may be calculated continuously up to the second predetermined time, even when the first predetermined time has elapsed.

Furthermore, in the case where communication is not established between portable terminal 3 and the external apparatus in step S1 (NO in step S1), terminal-side controller 31 obtains time information and own (portable terminal 3) position information using the GPS function (step S11). Then, terminal-side controller 31 transmits the obtained position information and time information to server 9 (step S11). The case where communication is not established between portable terminal 3 and the external apparatus is the case where the current position of portable terminal 3 (the user) is outdoors, or the case where the current position of portable terminal 3 (the user) is indoors but the external apparatus is not located near portable terminal 3.

Next, terminal-side controller 31 determines whether the current position of portable terminal 3 is indoors (step S12). Specifically, server 9 determines whether the current position of portable terminal 3 is indoors, based on the position information obtained in step S10, and transmits the information regarding the determination to portable terminal 3. Then, terminal-side controller 31 receives the information transmitted from server 9, and determines whether the current position of portable terminal 3 is indoors (step S12). The determination as to whether portable terminal 3 is located indoors is, for example, performed by server 9 based on the map information of cloud server 82 and the position information of portable terminal 3.

Next, terminal-side controller 31 determines that current position of portable terminal 3 is indoors based on the information from server 9 (YES in step S12), and calculates sub-cumulative value Bi of the amount of light corresponding to the indoor setting (place), from a table stored in memory 34 (step S13). Then, returning to step S4, terminal-side controller 31 calculates cumulative value X of the amount of light by adding sub-cumulative value Ai and estimated cumulative value Ci to sub-cumulative value Bi.

Furthermore, when, in step S12, server 9 determines the current position of portable terminal 3 is outdoors based on the position information and time information received in step S11, server 9 obtains the weather information corresponding to the received position information and time information from cloud server 82. Server 9 obtains estimated cumulative value Ci from information regarding the amount of light based on the weather information, and transmits the information of estimated cumulative value Ci, etc., to portable terminal 3. Then, portable terminal 3 receives the information of estimated cumulative value Ci from server 9. Accordingly, terminal-side controller 31 determines, based on the information from server 9, that the current position of portable terminal 3 is not indoors (NO in step S12).

It should be noted that terminal-side controller 31 may receive the weather information from server 9, and calculate estimated cumulative value Ci of the amount of light corresponding to the received weather information, from a table stored in memory 34.

Next, portable terminal 3 recognizes estimated cumulative value Ci received from server 9 (step S14). Then, returning to step S4, terminal-side controller 31 calculates cumulative value X of the amount of light by adding sub-cumulative value Ai and sub-cumulative value Bi to estimated cumulative value Ci.

The operation of light exposure system 1 according to this embodiment will be described with reference to FIG. 3 and FIG. 4 and exemplifying the user's cumulative value of the amount of light during the six hours from 0900 hrs to 1500 hrs.

FIG. 4 is a conceptual diagram illustrating the relationship between the amount of light and cumulative value and time in light exposure system 1 according to this embodiment. The bold solid line in FIG. 4 indicates the cumulative value of the amount of light. In this embodiment, since exposure to light having a luminance of approximately 3000 lx for two hours is recommended, the predetermined threshold value is set to 6,000 lx·h, as the amount of light that is needed in one day.

As illustrated in FIG. 3 and FIG. 4, the user, for example, uses light exposure apparatus 7 at the office for light exposure for one hour, from 9 o'clock to 10 o'clock in the morning. In this case, since communication is established between portable terminal 3 and light exposure apparatus 7 (YES in step S1), portable terminal 3 receives information regarding the amount of light from light exposure apparatus 7. The information regarding the amount of light that is received from light exposure apparatus 7 is information indicating exposure to light of 800 lx. Portable terminal 3 may receive a start signal indicating the start of light exposure from light exposure apparatus 7, and terminal-side controller 31 may count the light exposure time. Then, when light exposure apparatus 7 stops, portable terminal 3 may receive an end signal indicating the end of the light exposure, and terminal-side controller 31 may end the counting of the light exposure time.

Here, the user is exposed to light of 800 lx for one hour. As such, after one hour, terminal-side controller 31 sets, as A1, the cumulative value of the amount of light in this first light exposure in sub-cumulative value Ai of the amount of light of light exposure apparatus 7, and calculates 800 lx·h which is sub-cumulative value A1 of the amount of light (step S3). Terminal-side controller 31 calculates 800 lx·h which is cumulative value X of the amount of light=A1 (step S4). Display 33 of portable terminal 3 displays 800 lx·h which is cumulative value X of the amount of light (step S5). Then, since it is neither the first predetermined time nor the second predetermined time (NO in step S6 and NO in step S7), the flow returns to step S1.

Next, the user moves to the meeting room and is exposed to light from lighting apparatus 5 for one hour, from 10 o'clock to 11 o'clock. In this case, since communication is established between portable terminal 3 and lighting apparatus 5 (YES in step S1), portable terminal 3 receives information regarding the amount of light from lighting apparatus 5 (step S2). The information regarding the amount of light that is received from lighting apparatus 5 is information indicating exposure to light of 400 lx. Portable terminal 3 may measure the time for which the user is exposed to light from lighting apparatus 5, in the same manner as the case with the light exposure apparatus described above.

Here, the user is exposed to light of 400 lx for one hour. As such, after one hour, terminal-side controller 31 sets, as A2, the cumulative value of the amount of light in this second light exposure in sub-cumulative value Ai of the amount of light for lighting apparatus 5, and calculates 400 lx·h which is sub-cumulative value A2 of the amount of light (step S3). Terminal-side controller 31 calculates 1,200 lx·h which is cumulative value X of the amount of light=A1+A2 (step S4). Display 33 of portable terminal 3 displays 1,200 lx·h which is cumulative value X of the amount of light (step S5). Then, since it is neither the first predetermined time nor the second predetermined time (NO in step S6 and NO in step S7), the flow returns to step S1.

Next, the user is exposed to light from the sun for the one hour, from 11 o'clock to 12 o'clock, in which the user is traveling outdoors. In this case, since communication is not established between portable terminal 3 and lighting apparatus 5 (NO in step S1), portable terminal 3 is unable to receive information regarding the amount of light from lighting apparatus 5. As such, terminal-side controller 31 stores in memory 34 the data: cumulative value X of the amount of light=1,200 lx·h. Meanwhile, server 9 obtains weather information based on position information and time information received from portable terminal 3 and calculates estimated cumulative value Ci from the amount of light outdoors (step S14), and transmits cumulative value Ci to portable terminal 3.

It should be noted that terminal-side controller 31 may calculate estimated cumulative value Ci of the amount of light corresponding to the weather information received from server 9, from a table stored in memory 34.

It should be noted that, in portable terminal 3, terminal-side controller 31 may count the light exposure time outdoors, from the time when communication is no longer be established between portable terminal 3 and the external apparatus. In addition, terminal-side controller 31 may end the counting of the light exposure time outdoors, from the time when communication is established between portable terminal 3 and the external apparatus.

Here, the user is exposed to light of 10,000 lx outdoors for one hour. As such, after one hour, server-side controller 92 sets, as C1, the cumulative value of the amount of light in this first light exposure in estimated cumulative value Ci of the amount of light outdoors, and calculates 10,000 lx·h which is cumulative value C1. Portable terminal 3 receives information that cumulative value C1 is 10,000 lx·h, and recognizes cumulative value C1 (step S14). Terminal-side controller 31 calculates 11,200 lx·h which is cumulative value X of the amount of light=A1+A2+C1 (step S4). Display 33 of portable terminal 3 displays 11,200 lx·h which is cumulative value X of the amount of light. Then, since the current time is neither the first predetermined time nor the second predetermined time (NO in step S6 and NO in step S7), the flow returns to step S1.

Next, the user undergoes light exposure for two hours, from 1200 hrs to 1400 hrs. In this case, since communication is established between portable terminal 3 and light exposure apparatus 7 (YES in step S1), portable terminal 3 receives information regarding the amount of light from light exposure apparatus 7. The information regarding the amount of light that is received from light exposure apparatus 7 is information regarding (the amount of light in) the exposure to light of 800 lx.

Here, the user is exposed to light of 800 lx for two hours. As such, after two hours, terminal-side controller 31 sets, as A3, the cumulative value of the amount of light in this third exposure in sub-cumulative value Ai of the amount of light of light exposure apparatus 7, and calculates 1,600 lx·h which is sub-cumulative value A3 of the amount of light (step S3). Terminal-side controller 31 calculates 12,800 lx·h which is cumulative value X of the amount of light=A1+A2+C1+A3 (step S4). Display 33 of portable terminal 3 displays 12,800 lx·h which is cumulative value X of the amount of light.

Furthermore, terminal-side controller 31 determines that the current time is the first predetermined time (in the case of 1400 hrs). Furthermore, since cumulative value X of the amount of light at present is 12,800 lx·h, terminal-side controller 31, for example, when the predetermined value is set to 1,000 lx·h, determines that the remaining light amount is less than the predetermined value (NO in step S6). In addition, since it is not the second predetermined time (NO in step S7), the flow returns to S1.

Next, the user moves to the meeting room and is exposed to light from lighting apparatus 5 for one hour, from 1400 hrs to 1500 hrs. In this case, since communication is not established between portable terminal 3 and lighting apparatus 5 (NO in step S1), portable terminal 3 is unable to receive information regarding the amount of light from lighting apparatus 5. As such, terminal-side controller 31 stores in memory 34 the data: cumulative value X of the amount of light=12,800 lx·h. Furthermore, since information indicating outdoors is not received from server 9, terminal-side controller 31 determines that portable terminal 3 is located indoors (YES in step S12). In this case, terminal-side controller 31 recognizes the amount of light corresponding to the indoor setting (calculates sub-cumulative value Bi of the amount of light indoors), from the table stored in memory 34 (step S13). In this embodiment, for example, terminal-side controller 31 recognizes exposure to light of 400 lx which is the same as in the meeting room.

It should be noted that, in portable terminal 3, terminal-side controller 31 may count the light exposure time indoors, from the time when communication is no longer be established between portable terminal 3 and the external apparatus. In addition, terminal-side controller 31 may end the counting of the light exposure time indoors, from the time when communication is established between portable terminal 3 and the external apparatus.

Here, it is set that the user is exposed to light of 400 lx for one hour. As such, after one hour, terminal-side controller 31 calculates 400 lx·h which is sub-cumulative value B1 of the amount of light in this first exposure in sub-cumulative value Bi of the amount of light indoors (step S13). Terminal-side controller 31 calculates 13,200 lx·h which is cumulative value X of the amount of light=A1+A2+C1+A3+B1 (step S4). Display 33 of portable terminal 3 displays 13,200 lx·h which is cumulative value X of the amount of light (step S5). Since the current time (1500 hrs in this embodiment) is past the first predetermined time and the remaining light amount is less than the predetermined time, the answer in step S6 is NO. Then, the second predetermined time (1500 hrs in this embodiment) elapses, and the answer in step S7 is YES.

Next, terminal-side controller 31 determines whether cumulative value X=13,200 lx·h is greater than or equal to the predetermined threshold value. Terminal-side controller 31 determines that cumulative value X is greater than or equal to the predetermined threshold value (YES in step S8).

Then, in step S9, terminal-side controller 31 causes display 33 to display cumulative value X of the amount of light which the user is exposed to. Then, this flow ends.

Effect

Next, the effects of light exposure system 1, portable terminal 3, and lighting apparatus 5 in this embodiment will be described.

As described above, light exposure system 1 according to this embodiment includes an external apparatus that is placed on a facility and portable terminal 3 that communicates with the external apparatus, and manages the amount of light that the user is exposed to. Furthermore, the external apparatus transmits information regarding the amount of light which the user is exposed to, to portable terminal 3. In addition, portable terminal 3 includes terminal-side controller 31 which receives the information from the external apparatus and calculates cumulative value X of the amount of light from the information, when communication is established with the external apparatus; and display 33 which displays cumulative value X calculated by terminal-side controller 31.

According to this configuration, when portable terminal 3 establishes communication with the external apparatus, portable terminal 3 can receive information regarding the amount of light in the surroundings that is detected by the external apparatus. As such, portable terminal 3 can calculate cumulative value X of the amount of light, even without the user having to wear an apparatus such as a sensor (for example, an illuminance sensor).

Therefore, by using light exposure system 1, the total amount of light that a user is actually exposed to in one day can be calculated without the user having to wear a sensor. Furthermore, with this light exposure system 1, it is possible to display the calculated cumulative value X of the amount of light, and notify the cumulative value X to the user.

Furthermore, light exposure system 1 according to this embodiment includes server 9 and portable terminal 3 that communicates with server 9, and manages the amount of light which a user is exposed to. Furthermore, server 9 obtains position information of portable terminal 3 and time information corresponding to the position information from portable terminal 3. In addition, server 9 obtains weather information corresponding to the position information and the time information from an external source, when communication is not established between portable terminal 3 and an external apparatus that is placed on a facility. In addition, server 9 calculates estimated cumulative value Ci of the amount of light from the position information, the time information, and the weather information, and transmits information regarding estimated cumulative value Ci to portable terminal 3.

According to this configuration, portable terminal 3 can obtain estimated cumulative value Ci from server 9 even when outdoors where communication between portable terminal 3 and the external apparatus is not established.

Furthermore, light exposure system 1 according to this embodiment further includes an external apparatus. Furthermore, the external apparatus transmits information regarding the amount of light, which the user is exposed to, to portable terminal 3. Furthermore, portable terminal 3 includes terminal-side controller 31 that receives the information regarding the amount of light from the external apparatus and calculates sub-cumulative values Ai and Bi from the information regarding the amount of light, when communication is established with the external apparatus. In addition, terminal-side controller 31 calculates cumulative value X by adding up estimated cumulative value Ci and sub-cumulative values Ai and Bi.

According to this configuration, terminal-side controller 31 can calculate cumulative value X of the amount of light by adding up estimated cumulative value Ci, sub-cumulative value Ai, and sub-cumulative value Bi that are received from server 9. As such, even when the user is outdoors, the user's cumulative value X of the amount of light for one day can be calculated.

Furthermore, light exposure system 1 according to this embodiment includes lighting apparatus 5 that is placed on a facility and portable terminal 3 that communicates with lighting apparatus 5, and manages the amount of light which a user is exposed to. Furthermore, lighting apparatus 5 includes detector 52 that detects an amount of light in the surroundings, and communicator 54 that transmits information regarding the amount of light detected by detector 52 to portable terminal 3. In addition, portable terminal 3 includes terminal-side controller 31 that receives the information from lighting apparatus 5 and calculates cumulative value X of the amount of light from the information, when communication is established with lighting apparatus 5.

According to this configuration, when portable terminal 3 establishes communication with lighting apparatus 5, detector 52 detects the amount of light in the surroundings of lighting apparatus 5, and portable terminal 3 receives information regarding the amount of light from lighting apparatus 5, and thus cumulative value X of the amount of light can be calculated without the user having to wear an apparatus such as a sensor.

Furthermore, light exposure system 1 according to this embodiment includes lighting apparatus 5 and portable terminal 3 that communicates with lighting apparatus 5, and manages the amount of light which a user is exposed to. Furthermore, lighting apparatus 5 includes light source 51, controller 53 that calculates information regarding the amount of light of light source 51 which the user is exposed to; and a communicator that transmits the information calculated by controller 53. Portable terminal 3 includes terminal-side controller 31 that receives the information from lighting apparatus 5 and calculates cumulative value X of the amount of light from the information, when communication is established with lighting apparatus 5.

According to this configuration, when portable terminal 3 establishes communication with lighting apparatus 5, portable terminal 3 receives, from lighting apparatus 5, sub-cumulative value Ai which is information regarding the amount of light, and thus cumulative value X of the amount of light can be calculated without the user having to wear an apparatus such as a sensor.

Furthermore, in light exposure system 1 according to this embodiment, portable terminal 3 further includes display 33 that displays cumulative value X calculated by terminal-side controller 31.

According to this configuration, the calculated cumulative value X of the amount of light is displayed on display 33, and thus the user can recognize cumulative value X.

Furthermore, in light exposure system 1 according to this embodiment, when cumulative value X is less than a predetermined threshold value, display 33 displays that cumulative value X is less than the predetermined threshold value.

According to this configuration, display 33 displays the fact that the calculated cumulative value X of the amount of light is less than the predetermined threshold value. As such, the user can recognize the amount of light that he/she has been exposed to as well as recognize the amount of light that is still deficient (remaining light amount: insufficient light exposure).

Furthermore, in light exposure system 1 according to this embodiment, the external apparatus includes detector 52 that detects an amount of light in the surroundings.

According to this configuration, the amount of light in the surroundings of the external apparatus can be accurately detected.

Furthermore, portable terminal 3 according to this embodiment performs communication with an external apparatus that is placed on a facility. In addition, portable terminal 3 includes terminal-side controller 31 that receives the information regarding the amount of light, which a user is exposed to, detected by the external apparatus from the external apparatus and calculates cumulative value X of the amount of light from the information, when communication is established with the external apparatus; and display 33 that displays cumulative value X calculated by terminal-side controller 31.

According to this configuration, when portable terminal 3 establishes communication with the external apparatus, portable terminal 3 receives the information regarding the amount of light that is detected by the external apparatus, and thus cumulative value X of the amount of light can be calculated without the user having to wear an apparatus such as a sensor. Since display 33 displays the calculated cumulative value X of the amount of light, the user can recognize the amount of light that he/she has been exposed to.

Furthermore, portable terminal 3 according to this embodiment further includes a memory that stores historical data regarding cumulative value X for each day. In addition, terminal-side controller 31 makes a display, via display 33, to prompt like exposure, based on the historical information which is stored in the memory.

According to this configuration, the user can recognize the amount of light that he/she has been exposed to in the past from the details of the prompts for light exposure displayed on display 33. For example, when there is a deficiency in the amount of light needed for one day in the past (there is a remaining light amount), the user has a motivation for diligent light exposure. As such, the user can obtain the amount of light needed in one day by using light exposure apparatus 7, etc. As a result, using portable terminal 3 facilitates improvement of biological rhythm, and improvement of biological rhythm can be further expected with continued use of portable terminal 3.

Furthermore, in portable terminal 3 according to this embodiment, when cumulative value X is less than a predetermined threshold value, display 33 displays that cumulative value X is less than the predetermined threshold value.

According to this configuration, display 33 displays the fact that the calculated cumulative value X of the amount of light is less than the predetermined threshold value. As such, the user can recognize the amount of light that he/she has been exposed to as well as recognize the amount of light that is still deficient (remaining light amount: insufficient light exposure).

Furthermore, lighting apparatus 5 according to this embodiment communicates with portable terminal 3. In addition, lighting apparatus 5 includes: light source 51; detector 52 that detects an amount of light in the surroundings; controller 53 that calculates information regarding the amount of light of light source 51 detected by detector 52; and communicator 54 that transmits the information calculated by controller 53 to portable terminal 3.

According to this configuration, the amount of light in the surroundings of lighting apparatus 5 can be accurately detected, and the amount of light can be transmitted to portable terminal 3. As such, portable terminal 3 can more accurately calculate cumulative value X of the amount of light for one day.

Furthermore, in light exposure system 1 according to this embodiment, the external apparatus includes light source 51. Furthermore, the external apparatus transmits, as the information, at least one of light intensity information and time information of light which the user is exposed to.

Furthermore, in light exposure system 1 according to this embodiment, when no communication is established with the external apparatus, terminal-side controller 31 obtains position information of portable terminal 3.

Furthermore, terminal-side controller 31 transmits the position information and time information corresponding to the position information to server 9. In addition, terminal-side controller 31 obtains, from the server 9, information regarding an estimated amount of light, which the user is exposed to, corresponding to at least one the position information and the time information. In addition, terminal-side controller 31 calculates an additional cumulative value of the amount of light based on at least one of the information regarding an estimated amount of light corresponding to the position information and the information regarding an estimated amount of light corresponding to the time information, and adding the additional cumulative value to the cumulative value to calculate a new cumulative value.

Furthermore, in light exposure system 1 according to this embodiment, the information regarding an estimated amount of light includes weather information.

Furthermore, in light exposure system 1 according to this embodiment, terminal-side controller 31 determines whether a first predetermined time has elapsed, and determines whether a remaining light amount at the first predetermined time is greater than or equal to a predetermined value, terminal-side controller 31 calculates the cumulative value of the light amount, when terminal-side controller 31 determines that the first predetermined time has elapsed and that the remaining light amount at the first predetermined time is greater than or equal to the predetermined value. In addition, terminal-side controller 31 determines whether a second predetermined time after the first predetermined time has elapsed, when terminal-side controller 31 determines that at least either the first predetermined time has not elapsed or the remaining light amount is less than the predetermined value, and displays, via display 33, a remaining light amount at the second predetermined time, when terminal-side controller 31 determines that the second predetermined time has elapsed.

(Other Modifications, and so on)

Although a light exposure system, a portable terminal, and a lighting apparatus according to the present disclosure have been described based on an exemplary embodiment, the present disclosure is not limited to such embodiment.

For example, although in the foregoing embodiment a display is used as a means for announcing to the user that the cumulative value is less than the predetermined threshold value, aside from this, the indicator may be in the form which emits a sound to thereby enable the user to recognize the cumulative value of the amount of light, etc. Furthermore, the notification of the cumulative value of the amount of light may combine a display by the display and a sound. It should be noted that the sound can be realized by using a speaker, etc., that is built into or is an external attachment to the portable terminal.

Furthermore, in the foregoing embodiment, there may be a plurality of lighting apparatuses, and when communication is established with the plurality of lighting apparatuses, the portable terminal may select the lighting apparatus that is positioned closest to the portable terminal, and calculate the cumulative value using the information regarding the amount of light that is transmitted from that lighting apparatus.

Furthermore, in the foregoing embodiment, the TV may include a detector that detects the amount of light in the surroundings, a communicator that transmits information regarding the detected amount of light, etc. In this case, the portable terminal may receive the information regarding the amount of light from the TV, and calculate the cumulative value. In other words, the collection of information regarding the amount of light is not limited to a lighting apparatus or a light exposure apparatus.

Furthermore, in the foregoing embodiment, even upon reaching a time (for example, 1400 hrs) that precedes 1500 hrs (an example of the predetermined time), for example, in the case where the cumulative value is less than the predetermined value, the terminal-side controller need not carry out a display prompting the user to undergo light exposure. In this case, the terminal-side controller may simply cause the display to display only the cumulative value of the amount of light.

Furthermore, in the foregoing embodiment, when the amount of light obtained is less than a specified value, the terminal-side controller may, without accumulating the amount of light obtained, calculate a cumulative value of the amount of light that is greater than or equal to the specified value, and cause the display to display the cumulative value. It should be noted that the specified value can be set arbitrarily.

Furthermore, in the foregoing embodiment, the light source is not limited to the above-described configuration, and a chip-on-board (COB) module in which an LED chip is directly mounted on a circuit board may be used. Furthermore, the light-emitting element included in the light source is not limited to an LED, and may be for example another solid-state light-emitting element such as a semiconductor light-emitting element such as a semiconductor laser or an electroluminescent (EL) element such as an organic EL or inorganic EL element.

Aside from the above, forms obtained by various modifications to the exemplary embodiment that can be conceived by a person of skill in the art as well as forms realized by arbitrarily combining structural components and functions in the exemplary embodiment which are within the scope of the essence of the present disclosure are included in the present disclosure.

What is claimed is:

1. A light exposure system that manages an amount of light which a user is exposed to, the light exposure system comprising:
an external apparatus that is placed on a facility; and
a portable terminal that communicates with the external apparatus, wherein:
the external apparatus transmits information regarding the amount of light which the user is exposed to, to the portable terminal,
the portable terminal includes:
a terminal-side controller that receives the information from the external apparatus and calculates a cumulative value of the amount of light from the information, when a communication is established with the external apparatus; and
an indicator that indicates the cumulative value calculated by the terminal-side controller, and
when no communication is established with the external apparatus, the terminal-side controller:
obtains position information of the portable terminal;
transmits the position information and time information corresponding to the position information to a server; and
obtains, from the server, information regarding an estimated amount of light, which the user is exposed to, corresponding to at least one of the position information and the time information: and
calculates an additional cumulative value of the amount of light based on at least one of the information regarding an estimated amount of light corresponding to the position information and the information regarding an estimated amount of light corresponding to the time information, and adding the additional cumulative value to the cumulative value to calculate a new cumulative value.

2. The light exposure system according to claim 1, wherein
the external apparatus:
includes a light source; and
transmits, as the information, at least one of light intensity information and time information of light which the user is exposed to.

3. The light exposure system according to claim 1, wherein
the external apparatus includes a detector that detects an amount of light in surroundings.

4. The light exposure system according to claim 1, wherein
when the cumulative value is less than a predetermined threshold value, the indicator indicates that the cumulative value is less than the predetermined threshold value.

5. The light exposure system according to claim 1, wherein
the information regarding an estimated amount of light includes weather information.

6. The light exposure system according to claim 1, wherein:
the external apparatus transmits the information for days,
the portable terminal further includes a memory that stores historical information regarding the cumulative value of the amount of light from the information for the days, and
the terminal-side controller makes an indication, via the indicator, to prompt light exposure, based on the historical information which is stored in the memory.

7. A light exposure system that manages an amount of light which a user is exposed to, the light exposure system comprising:
an external apparatus that is placed on a facility; and
a portable terminal that communicates with the external apparatus, wherein:
the external apparatus transmits information regarding the amount of light which the user is exposed to, to the portable terminal,
the portable terminal includes:
a terminal-side controller that receives the information from the external apparatus and calculates a cumulative value of the amount of light from the information, when a communication is established with the external apparatus; and
an indicator that indicates the cumulative value calculated by the terminal-side controller, and
the terminal-side controller:
determines whether a first predetermined time has elapsed, and determines whether a remaining light amount at the first predetermined time is greater than or equal to a predetermined value;
calculates the cumulative value of the light amount, when the terminal-side controller determines that the first predetermined time has elapsed and that the remaining light amount at the first predetermined time is greater than or equal to the predetermined value;
determines whether a second predetermined time after the first predetermined time has elapsed, when the terminal-side controller determines that at least either the first predetermined time has not elapsed or the remaining light amount is less than the predetermined value; and
indicates, via the indicator, a remaining light amount at the second predetermined time, when the terminal-side controller determines that the second predetermined time has elapsed.

8. The light exposure system according to claim 7, wherein
the external apparatus:
includes a light source; and
transmits, as the information, at least one of light intensity information and time information of light which the user is exposed to.

9. The light exposure system according to claim 7, wherein
the external apparatus includes a detector that detects an amount of light in surroundings.

10. The light exposure system according to claim 7, wherein
when the cumulative value is less than a predetermined threshold value, the indicator indicates that the cumulative value is less than the predetermined threshold value.

11. The light exposure system according to claim 7, wherein:
the external apparatus transmits the information for days,
the portable terminal further includes a memory that stores historical information regarding the cumulative value of the amount of light from the information for the days, and
the terminal-side controller makes an indication, via the indicator, to prompt light exposure, based on the historical information which is stored in the memory.

* * * * *